(12) United States Patent
Bates

(10) Patent No.: US 8,650,796 B1
(45) Date of Patent: Feb. 18, 2014

(54) DEVICE FOR PROTECTING A FISHING ROD

(76) Inventor: Eric M. Bates, New York, NY (US)

( * ) Notice: Subject to any disclaimer, the term of this patent is extended or adjusted under 35 U.S.C. 154(b) by 0 days.

(21) Appl. No.: 12/799,991

(22) Filed: May 6, 2010

(51) Int. Cl.
*A01K 97/08* (2006.01)

(52) U.S. Cl.
USPC ............... 43/26; 206/315.11; 224/922; 220/8

(58) Field of Classification Search
USPC ............... 43/26; 206/315.11; 224/922; 220/8
See application file for complete search history.

(56) References Cited

U.S. PATENT DOCUMENTS

| | | | | | |
|---|---|---|---|---|---|
| 170,188 | A | * | 11/1875 | Perry | 43/26 |
| 1,252,775 | A | * | 1/1918 | Butcher | 220/8 |
| 1,625,510 | A | * | 4/1927 | Tredwell | 43/18.1 CT |
| 1,643,003 | A | * | 9/1927 | Chromczak | 43/18.1 CT |
| 1,731,173 | A | * | 10/1929 | Pope | 43/18.1 CT |
| 1,914,500 | A | * | 6/1933 | Groschup | 43/18.1 CT |
| 2,143,720 | A | * | 1/1939 | Smith | 43/26 |
| 2,144,876 | A | * | 1/1939 | Garnett | 224/922 |
| 2,473,977 | A | * | 6/1949 | Tutton | 206/315.11 |
| 2,536,797 | A | * | 1/1951 | Cooke | 224/922 |
| 2,919,017 | A | * | 12/1959 | Weber | 43/26 |
| 3,131,503 | A | * | 5/1964 | Gottula | 43/26 |
| 3,349,512 | A | * | 10/1967 | Walker | 43/26 |
| 3,575,327 | A | * | 4/1971 | Harrison | 43/26 |
| 3,624,948 | A | * | 12/1971 | De Baker, Sr. | 43/26 |
| 3,674,190 | A | * | 7/1972 | Wright | 43/26 |
| 3,772,819 | A | * | 11/1973 | Ratzlaff | 43/26 |
| 3,811,216 | A | * | 5/1974 | Sauey et al. | 43/26 |
| 3,858,833 | A | * | 1/1975 | Fink | 248/533 |
| 3,921,868 | A | * | 11/1975 | Reichbach | 224/922 |
| 3,927,486 | A | * | 12/1975 | Yuen | 43/23 |
| 3,972,144 | A | * | 8/1976 | Geisler | 43/26 |
| 4,171,588 | A | * | 10/1979 | Hoffman et al. | 43/26 |
| 4,222,193 | A | * | 9/1980 | Beck | 43/26 |
| 4,261,129 | A | * | 4/1981 | Ohmura | 43/26 |
| 4,369,904 | A | * | 1/1983 | Christensen | 206/315.11 |
| 4,530,178 | A | * | 7/1985 | Rauscher | 43/26 |
| 4,546,877 | A | * | 10/1985 | Evans | 224/922 |
| 4,624,382 | A | * | 11/1986 | Tontarelli | 220/8 |
| 4,641,454 | A | * | 2/1987 | Ray et al. | 43/26 |
| 4,653,216 | A | * | 3/1987 | Inoue | 43/18.5 |
| 4,916,852 | A | * | 4/1990 | Zebleckis | 43/26 |
| 4,967,504 | A | * | 11/1990 | Craft | 43/26 |
| 5,005,743 | A | * | 4/1991 | Ramsay | 224/922 |
| 5,046,279 | A | * | 9/1991 | Smith et al. | 43/26 |
| 5,259,140 | A | * | 11/1993 | Epperson | 43/26 |
| 5,277,306 | A | * | 1/1994 | Sargent | 43/26 |
| 5,293,711 | A | * | 3/1994 | Robinson | 43/26 |
| 5,297,676 | A | * | 3/1994 | Coleman | 206/315.11 |
| 5,327,669 | A | * | 7/1994 | Lannan et al. | 43/26 |
| 5,341,590 | A | * | 8/1994 | Hepworth et al. | 43/26 |
| 5,417,354 | A | * | 5/1995 | Jones | 43/26 |
| 5,425,194 | A | * | 6/1995 | Miller | 43/26 |

(Continued)

FOREIGN PATENT DOCUMENTS

| | | | | | |
|---|---|---|---|---|---|
| DE | 3517393 | A1 | * | 11/1985 | A01K 97/08 |
| GB | 2224916 | A | * | 5/1990 | A01K 97/08 |

(Continued)

*Primary Examiner* — Darren W Ark

(74) *Attorney, Agent, or Firm* — Richard L. Miller

(57) ABSTRACT

A device for protecting a fishing rod which comprises a hollow telescopic tube having a closed top end and an open bottom end. The hollow telescopic tube fits over and provides protection to the fishing rod. A mechanism is for securing the hollow telescopic tube at the open bottom end to the fishing rod.

1 Claim, 3 Drawing Sheets

(56) References Cited

U.S. PATENT DOCUMENTS

| | | | |
|---|---|---|---|
| 5,450,956 A * | 9/1995 | Peckenpaugh et al. | 206/315.11 |
| 5,515,641 A * | 5/1996 | D'Alessandro | 43/26 |
| 5,640,795 A * | 6/1997 | Wambolt | 43/26 |
| 5,782,372 A * | 7/1998 | Weiss et al. | 220/8 |
| 5,836,103 A * | 11/1998 | Taylor | 43/26 |
| 5,937,568 A * | 8/1999 | Morgan | 43/26 |
| 6,062,382 A * | 5/2000 | Czerkie | 206/315.11 |
| 6,085,695 A * | 7/2000 | Miller et al. | 43/26 |
| 6,263,610 B1 * | 7/2001 | Doubts, Jr. | 43/26 |
| 6,408,564 B1 * | 6/2002 | Murphy | 43/26 |
| 6,450,333 B1 * | 9/2002 | McClenahan et al. | 206/315.11 |
| 6,564,498 B2 * | 5/2003 | Sawtell | 43/26 |
| 6,668,481 B2 * | 12/2003 | Garcia | 43/26 |
| 6,760,994 B2 * | 7/2004 | Henault et al. | 43/26 |
| 6,865,841 B2 * | 3/2005 | Wieringa | 43/26 |
| 7,077,266 B2 * | 7/2006 | Dietrich | 220/8 |
| 7,383,658 B1 * | 6/2008 | Reichert et al. | 43/26 |
| 2006/0196102 A1 * | 9/2006 | Gagnon | 43/26 |

FOREIGN PATENT DOCUMENTS

| | | | | |
|---|---|---|---|---|
| JP | 07257565 A | * | 10/1995 | A01K 97/08 |
| JP | 11289946 A | * | 10/1999 | A01K 97/08 |
| JP | 2006136227 A | * | 6/2006 | A01K 97/08 |
| JP | 2007104988 A | * | 4/2007 | A01K 97/08 |
| JP | 2008245543 A | * | 10/2008 | A01K 97/08 |
| JP | 2010104337 A | * | 5/2010 | A01K 97/08 |

* cited by examiner

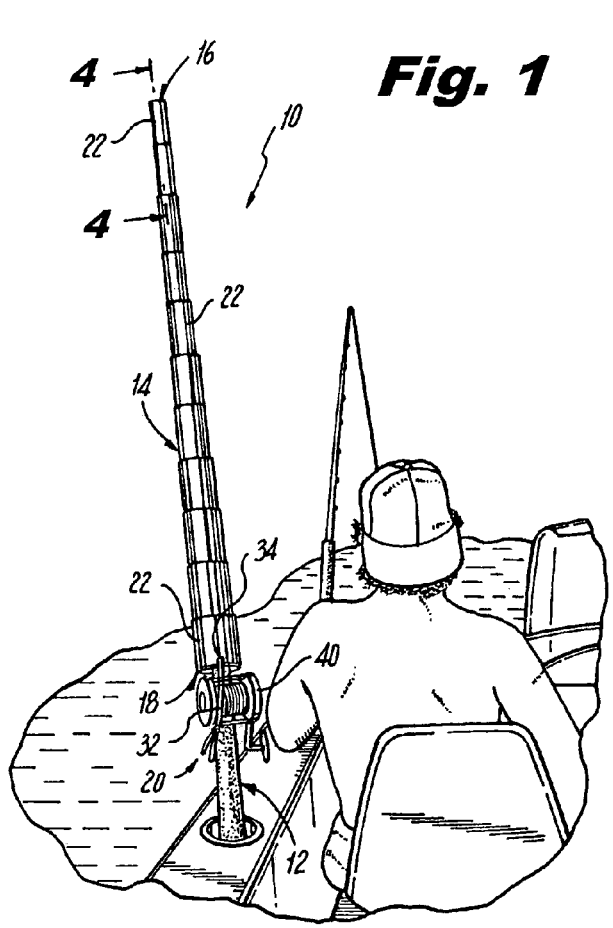
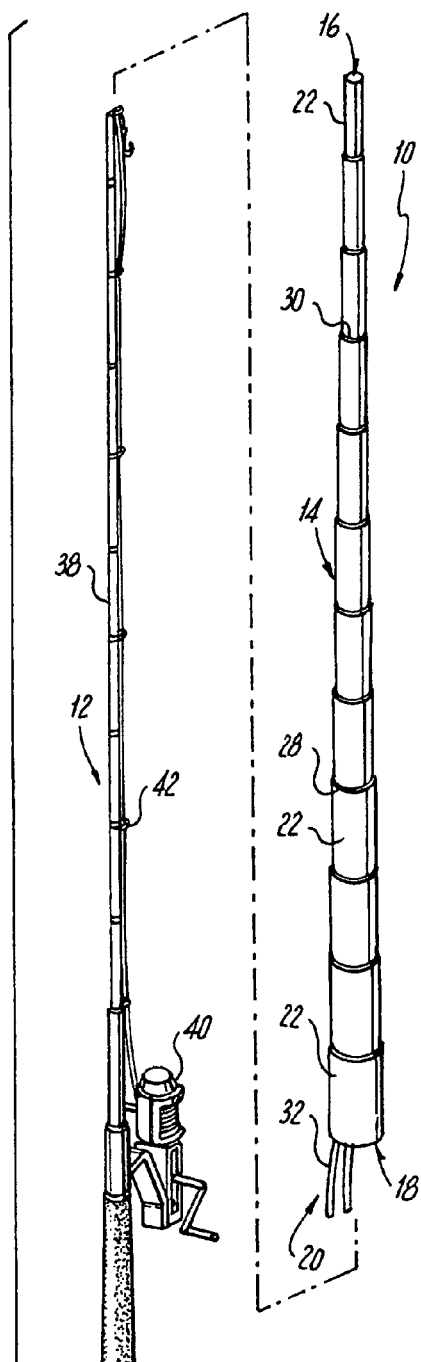
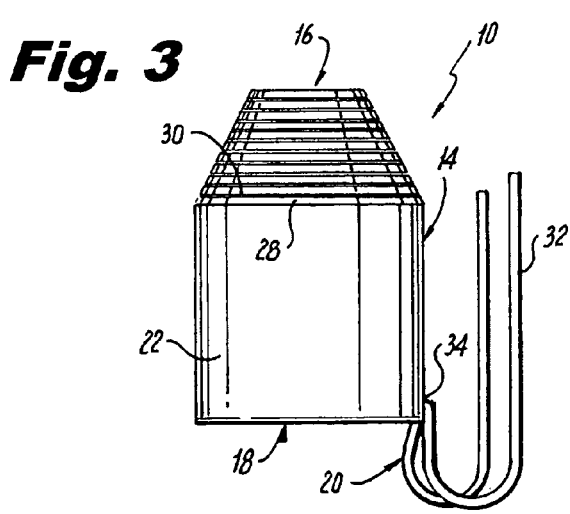
Fig. 1
Fig. 2
Fig. 3

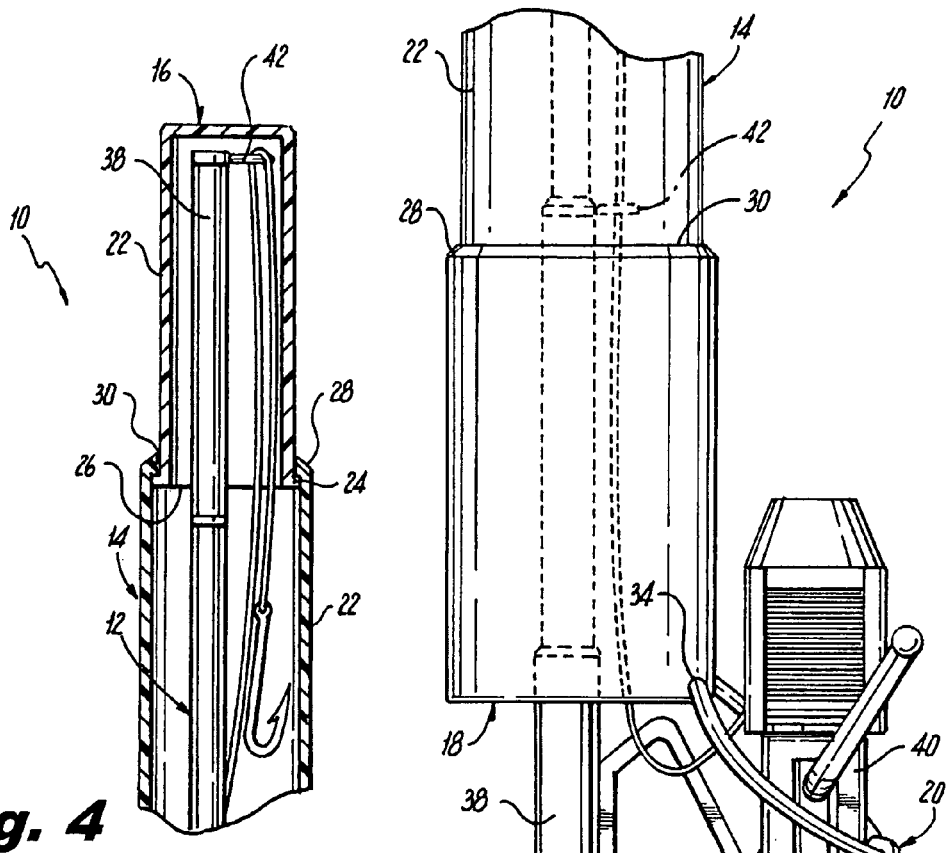
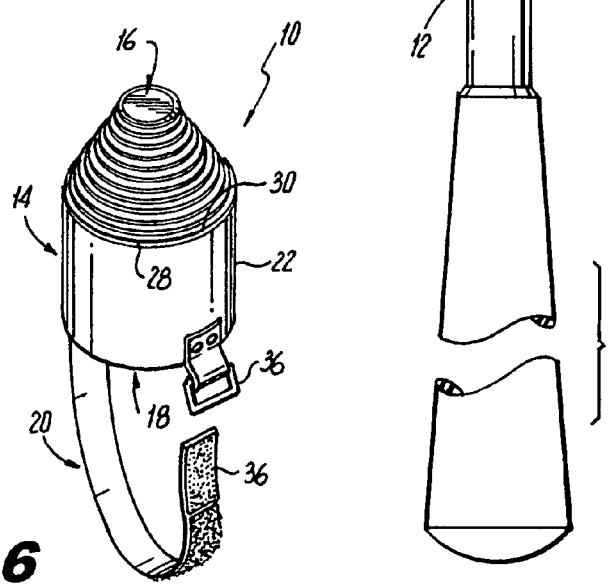
Fig. 4
Fig. 5
Fig. 6

DEVICE FOR PROTECTING A FISHING ROD

BACKGROUND OF THE INVENTION

1. Field of the Invention

The present invention relates to a fishing rod guard, and more particularly, a device for protecting a fishing rod.

2. Description of the Prior Art

Numerous innovations for fishing rod protectors have been provided in the prior art that will be described. Even though these innovations may be suitable for the specific individual purposes to which they address, however, they differ from the present invention.

A FIRST EXAMPLE, U.S. Patent Office Document No. 3,811,216, Issued on May 21, 1974, to Sauey et al. teaches an adjustable fishing rod case with an outer member, an inner member, and means for securing the members together. The outer member and inner member are telescopically engaged. A plastic hinge lever, including a pin, is mounted on a collar at one end of the outer member. The pin engages one of a series of well-shaped cups in the inner member to lock the members together. A longitudinal groove in the inner member receives a projection on the collar of the outer member to guide the well-shaped cups to the pin.

A SECOND EXAMPLE, U.S. Patent Office Document No. 3,858,833, Issued on Jan. 7, 1975, to Fink teaches a fishing rod holder having a Y-shaped configuration on one end and a pointed extension on the other which includes several hollow, tubular, telescopically engaged body members having sealing means between the several body members to render the same watertight to insure floatation of the fishing rod holder and to enable it to be collapsed into a small size.

A THIRD EXAMPLE, U.S. Patent Office Document No. 4,261,129, Issued on Apr. 14, 1981, to Ohmura teaches a protector for guides of a telescopic rod that comprises a resilient cylindrical member with its one end being closed, a hook member provided at its closed end and an opening notched longitudinally along the cylindrical member. The hook member so designed to serves as a hanger of telescopic fishing rods for display and to serve as a shock absorber during transportation.

A FOURTH EXAMPLE, U.S. Patent Office Document No. 4,653,216, Issued on Mar. 31, 1987, to Inoue teaches a fishing rod comprising a tube formed of a high strength fiber sheet fabricated from the class consisting of glass fibers, carbon fibers, and amide fibers; the sheet being impregnated with a synthetic resin. A reinforcement layer of high strength fibers is disposed about the rod; the layer comprising a plurality of parallel spaced bundles extending substantially from one end to the other end of the rod in a twill configuration.

A FIFTH EXAMPLE, U.S. Patent Office Document No. 4,967,504, Issued on Nov. 6, 1990, to Craft teaches a holder for protecting a fishing rod and fishing reel. The holder includes an elongated tube having a hollow interior for receiving a rod portion of the fishing rod, the tube having a first end and a second end; and a body having a hollow interior for receiving the fishing reel and at least a portion of a handle portion of the fishing rod; the body having a first end and a second end; the first end of the body being attached to the first end of the tube with the hollow interior of the body communicating with the hollow interior of the tube.

A SIXTH EXAMPLE, U.S. Patent Office Document No. 5,425,194, Issued on Jun. 20, 1995, to Miller teaches a fishing rod case formed from an elongated, cylindrical tube with opposed open ends is divided into longitudinal segments, by a continuous hinge and a cut offset therefrom. The cut has a tongue and a groove extending fully along opposing edges thereof for mating when the tube is closed about the hinge. Straps mounted on an exterior surface of the tube hold the tube in this closed condition. When so mated, the tongue and groove cannot disengage even if pressure is placed on the tube surface. Resiliently compressible retainers are arranged in spaced apart opposing pairs within the tube. Each of the retainers is contoured to fit snugly in its respective tube segment. An upper portion of the retainer extends beyond the diametric dividing plane. Each retainer has several slits therein longitudinally aligned with the tube and with corresponding ones of the slits in corresponding ones of the pairs of segments. The slits extend from the upper portion of the retainer toward the base portion to axes somewhat symmetrically disposed within the tube. A segment of the upper portions of each of the retainers proximate the hinge is reduced so that the slits are distorted away from the hinge when the tongue and groove are in the mated condition. This enhances the firm grip on the rods by the retainer. A pair of end caps are secured by straps over the ends of the tube when the tongue and groove are in the mated condition.

A SEVENTH EXAMPLE, U.S. Patent Office Document No. 5,450,956, Issued on Sep. 19, 1995, to Peckenpaugh Sr. et al teaches an adjustable, telescopic, carrying and storage case of variable and fixed length that includes a hollow adjustable, telescopic front member of variable length and a hollow adjustable, telescopic rear member of variable length that can be separated or connected tightly. The case is adjustable in length and can be used at a maximum length and at a minimum length for ease in transportation. The case is preferably used for carrying and storing different items including telescopic fishing rod assemblies. The telescopic front member comprises a first container portion and a plurality of adjustable front telescopic locking sections which are placed in an interlocking relationship through a plurality of annular tapered locking surfaces and a number of annular locking surfaces. The telescopic rear member comprises a second container portion and a plurality of adjustable rear telescopic locking sections which are placed in an interlocking relationship through a plurality of annular tapered locking surfaces and a number of annular locking surfaces.

AN EIGHTH EXAMPLE, U.S. Patent Office Document No. 5,640,795, Issued on Jun. 24, 1997, to Wambolt teaches an improved fishing rod protector that is to be used on a two piece fishing rod with equal or unequal fishing rod section lengths, with or without a fishing reel attached. The invention is comprised of two cylinders, each open on one end and closed on the other. The cylinders are attached to each other by means of an elastic cord routed through the hollows of each cylinder and connected at the rear of each cylinder. The two piece fishing rod sections are arranged, then closely grouped and inserted into the hollows of the cylinders. The elastic cord is stretched and then returned to its undisturbed length, thus holding the two cylinders in place. A fishing reel can be attached to the rod and the fishing line can be strung on the fishing rod guides without affecting the invention. A portion of the fishing rod is exposed for viewing. When not in use, the invention stores conveniently one cylinder inside the other.

A NINTH EXAMPLE, U.S. Patent Office Document No. 6,668,481, Issued on Dec. 30, 2003, to Garcia teaches a hard shell case for an assembled fishing rod and reel includes a forward and rearward rod cover tubes and a laterally hinged reel case. the forward rod cover extends rearwardly beyond the attached reel of the assembly, with a portion of the forward cover cut away for reel clearance as the cover is installed on the rod. The rearward rod cover slides over the rearward end of the forward rod cover, leaving an exposed area around the reel attachment when the two rod cover portions are installed on the rod. A laterally hinged reel cover is then placed over the rod cover assembly opposite the reel and closed over the reel to complete the installation. The forward rod cover may alternatively be constructed in two telescoping portions to adjust for different rod lengths or disassembled rods, and a pliable reel cover may also be provided.

It is apparent now that numerous innovations for fishing rod protectors have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a device for protecting a fishing rod that avoids the disadvantages of the prior art.

ANOTHER OBJECT of the present invention is to provide a device for protecting a fishing rod that is simple and inexpensive to manufacture.

STILL ANOTHER OBJECT of the present invention is to provide a device for protecting a fishing rod that is simple to use.

BRIEFLY STATED, STILL YET ANOTHER OBJECT of the present invention is to provide a A device for protecting a fishing rod which comprises a hollow telescopic tube having a closed top end and an open bottom end. The hollow telescopic tube fits over and provides protection to the fishing rod. A mechanism is for securing the hollow telescopic tube at the open bottom end to the fishing rod.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 1 is a diagrammatic perspective view of an embodiment of the present invention in use;

FIG. 2 is a diagrammatic perspective view showing the present invention in an extended state, ready to be placed onto or removed from a fishing rod;

FIG. 3 is a diagrammatic elevational view of the present invention in a compressed state;

FIG. 4 is an enlarged diagrammatic cross sectional view, with parts broken away, taken on line 4-4 in FIG. 1;

FIG. 5 is an enlarged diagrammatic elevational view, with parts broken away, of the present invention showing a first securement component on a cooperating fishing rod;

FIG. 6 is a diagrammatic perspective view of the present invention in the compressed state, showing a second securement component.

Figure 7:
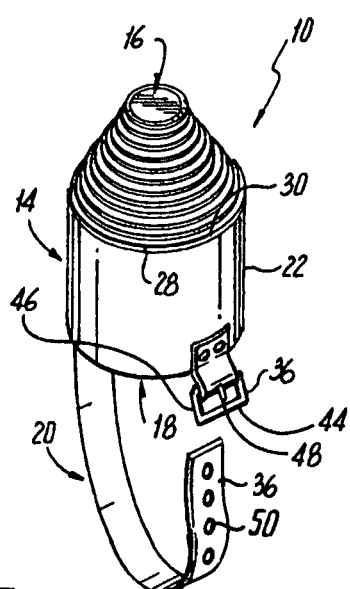
FIG. 7 is a diagrammatic perspective view of the present invention in the compressed state. showing another securement component.

A MARSHALING OF REFERENCE NUMERALS UTILIZED IN THE DRAWING 10 protecting device
12 fishing rod
14 hollow telescopic tube of device 10
16 closed top end of tube 14
18 open bottom end of tube 14
20 securing mechanism of device 10
22 tubular section of tube 14
24 radially outwardly extending flange on open bottom end 26
26 open bottom end of tubular section 22
28 radially inwardly extending flange on open top end 30
30 open top end of tubular section 22
32 lace for securing mechanism 20
34 aperture near open bottom end 18
36 clasping device for securing mechanism 30
38 fishing pole of fishing rod 12
40 fishing reel of fishing rod 12
42 fishing line guide of fishing rod 12
44 conventional buckling device
46 frame of conventional buckling device 44
48 prong of conventional buckling device 44
50 holes through belt of securing mechanism 20

DETAILED DESCRIPTION OF THE PREFERRED EMBODIMENT

Referring now to the figures, in which like numerals indicate like parts, and particularly to FIGS. 1 through 6, which are a diagrammatic perspective view of an embodiment of the present invention in use; a diagrammatic perspective view showing the present invention in an extended state, ready to be placed onto or removed from a fishing rod; a diagrammatic elevational view of the present invention in a compressed state; an enlarged diagrammatic cross sectional view, with parts broken away, taken on line 4-4 in FIG. 1; an enlarged diagrammatic elevational view, with parts broken away, of the present invention showing a first securement component on a cooperating fishing rod; and a diagrammatic perspective view of the present invention in the compressed state, showing a second securement component, and as such, will be discussed with reference thereto.

The present invention is a device 10 for protecting a fishing rod 12 which comprises a hollow telescopic tube 14 having a closed top end 16 and an open bottom end 18. The hollow telescopic tube 14 fits over and provides protection to the fishing rod 12. A mechanism 20 is for securing the hollow telescopic tube 14 at the open bottom end 18 to the fishing rod 12.

The hollow telescopic tube 14 comprises a plurality of overlapping concentric tubular sections 22 of different diameters. Each tubular section 22 has a radially outwardly extending flange 24 about an open bottom end 26 and a radially inwardly extending flange 28 about an open top end 30. The uppermost tubular section 22 that has the smallest diameter is formed with the closed top end 16, thereby allowing the hollow telescopic tube 14 to be extensible for use and compressible for storage.

The securing mechanism 20, as shown in FIGS. 1, 2, 3, and 5, comprises a lace 32 that extends through an aperture 34 near the open bottom end 18 of the tubular section 22 having the largest diameter. The securing mechanism 20, as shown in FIG. 6, comprises a belt having a clasping device 36 affixed to the open bottom end 18 of the tubular section 22 having the largest diameter. It is to be noted that the clasping device can be any number of various mechanisms including but not limited to hook and loop pie fastener material, a combination of a co-operating male and female snap fasteners, co-operating magnetic buckling devices, conventional buckling device 44 having a frame 46 and a prong 48, wherein the prong 48 is pivotally attached to the frame 46 and is securable within one of a plurality of holes 50 extending transversely through the belt of securing mechanism 20, and a free end of the prong 48 extends within a perimeter of the frame 46, as shown in FIG. 7, or any number of unlimited clasping mechanisms of which many are well known in the prior art.

The securing mechanism 20 can further consist of a clip (lobster claw, etc.) A laureate, an elastic band, a magnetic fastener, or any combination thereof, can be adjustable. The securing mechanism 20 can be secured to any part of the fishing rod 12, such as the fishing pole 38, fishing reel 40, fishing line guides 42, material attached to the fishing rod 12 and any other object requiring protection use the device 10. The protecting device 10 can be fabricated out of a durable non-corrosive material, such as plastic or metal.

It will be understood that each of the elements described above, or two or more together, may also find a useful application in other types of constructions differing from the types described above.

While the invention has been illustrated and described as embodiments of a device for protecting a fishing rod, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A device for protecting a fishing rod which comprises:
   a) a hollow telescopic tube having a closed top end and an open bottom end, wherein said hollow telescopic tube fits over and provides protection to the fishing rod;
   b) means for securing said hollow telescopic tube at said open bottom end to the fishing rod;

wherein said hollow telescopic tube comprises a plurality of overlapping concentric tubular sections of different diameters;

wherein an uppermost tubular section of said plurality of overlapping concentric tubular sections having a smallest diameter defining said closed top end of said hollow telescopic tube, thereby allowing said hollow telescopic tube to be extensible for use and compressible for storage;

wherein other tubular sections of said plurality of overlapping concentric tubular sections each having a radially outwardly extending flange about an open bottom end and a radially inwardly extending flange about an open top end;

wherein said securing means comprises a belt having a first portion comprising an elongated member with a plurality of holes extending transversely therethrough and affixed to one side of said open bottom end of one of said other tubular sections of said plurality of overlapping concentric tubular sections having a largest diameter which defines said open bottom end of said hollow telescopic tube and a second portion comprising a conventional buckling device having a frame and a prong, affixed to an other opposing side of said open bottom end of said one of said other tubular sections of said plurality of overlapping concentric tubular sections having the largest diameter; and wherein said prong of said conventional buckling device is pivotally attached to said frame of said conventional buckling device at one end of said prong and an opposing free end of said prong extends within a perimeter of said frame of said conventional buckling device.

* * * * *